United States Patent
Kordel et al.

(10) Patent No.: US 10,538,306 B2
(45) Date of Patent: Jan. 21, 2020

(54) WING FLAP DEFLECTION CONTROL REMOVAL

(71) Applicant: The Boeing Company, Chicago, IL (US)

(72) Inventors: Jan A. Kordel, Redmond, WA (US); Jacob Daniel Virnig, Woodinville, WA (US); Michael Albert Balzer, Bellevue, WA (US); Bruce Detert, Seattle, WA (US); Emanuel Rizal Setiawan, Kent, WA (US)

(73) Assignee: The Boeing Company, Chicago, IL (US)

( * ) Notice: Subject to any disclaimer, the term of this patent is extended or adjusted under 35 U.S.C. 154(b) by 365 days.

(21) Appl. No.: 15/386,211

(22) Filed: Dec. 21, 2016

(65) Prior Publication Data

US 2018/0170515 A1  Jun. 21, 2018

(51) Int. Cl.
  *B64C 3/50* (2006.01)
  *B64C 9/20* (2006.01)
  B64C 3/44 (2006.01)
  B64C 9/14 (2006.01)

(52) U.S. Cl.
  CPC .......... *B64C 3/50* (2013.01); *B64C 9/20* (2013.01); *B64C 2003/445* (2013.01); *B64C 2009/143* (2013.01)

(58) Field of Classification Search
  CPC ........ B64C 2009/143; B64C 2003/445; B64C 3/50; B64C 9/20
  See application file for complete search history.

(56) References Cited

U.S. PATENT DOCUMENTS

| | | | |
|---|---|---|---|
| 2,276,522 A * | 3/1942 | Staufer | B64C 21/08 244/216 |
| 4,283,029 A | 8/1981 | Rudolph | |
| 8,534,611 B1 * | 9/2013 | Pitt | B64C 3/50 244/214 |

(Continued)

FOREIGN PATENT DOCUMENTS

| | | |
|---|---|---|
| GB | 1508389 A | 4/1978 |
| RU | 2173284 C2 | 9/2001 |

OTHER PUBLICATIONS

"Russian Application Serial No. 2017129835/11, Office Action dated Sep. 26, 2018", 12 pgs.

(Continued)

*Primary Examiner* — Magdalena Topolski
(74) *Attorney, Agent, or Firm* — Kwan & Olynick LLP

(57) ABSTRACT

A high-lift device surface and associated method of designing the high-lift device surface is described. The flap can be attached to a wing on aircraft. The method can involve determining a manufactured shape of the flap. The manufactured flap shape can be deflected in some manner, such as bent or twisted, so that under selected flight conditions, such as cruise, the manufactured flap shape morphs into a second desired shape that satisfies specified constraints, such as geometric and sealing constraints. An advantage of the approach is that the flap doesn't have to be mechanically forced, using mechanical elements, into the second desired shape. The elimination of the mechanical elements results in weight and cost savings to aircraft on which the flap is deployed.

23 Claims, 8 Drawing Sheets

(56) References Cited

U.S. PATENT DOCUMENTS

| | | | |
|---|---|---|---|
| 9,038,964 B2 | 5/2015 | Wildman | |
| 9,550,559 B1* | 1/2017 | Droney | B64C 9/18 |
| 2010/0219299 A1* | 9/2010 | Holzhausen | B64C 9/22 |
| | | | 244/214 |
| 2012/0261517 A1* | 10/2012 | Turner | B64C 7/00 |
| | | | 244/203 |
| 2012/0292454 A1* | 11/2012 | Schroeder | B64C 9/24 |
| | | | 244/214 |
| 2014/0048655 A1* | 2/2014 | Hue | B64C 9/02 |
| | | | 244/214 |
| 2015/0210379 A1* | 7/2015 | Henning | B64C 9/22 |
| | | | 244/214 |

OTHER PUBLICATIONS

"European Application Serial No. 17209657.0, Search Report dated Mar. 7, 2018", 12 pgs.

Dulikravich, G. S., "Shape Inverse Design and Optimization for Three-Dimensional Aerodynamics", 33rd Aerospace Sciences Meeting and Exhibit, Jan. 1995, 12 pgs.

Johnson, Forrester T. et al., "Thirty years of development and application of CFD at Boeing Commercial Airlines, Seattle", Computers and Fluids 34, 2005, pp. 1115-1151.

Kubrynski, K., "Application of the panel method to subsonic aerodynamic design", Inverse Problems in Engineering, 5:2, pp. 87-112.

Labrujere, Th. E. et al., "Computational Methods for the Aerodynamic Design of Aircraft Components", Annu. Rev. Fluid Mech. 25, 1993, pp. 183-214.

\* cited by examiner

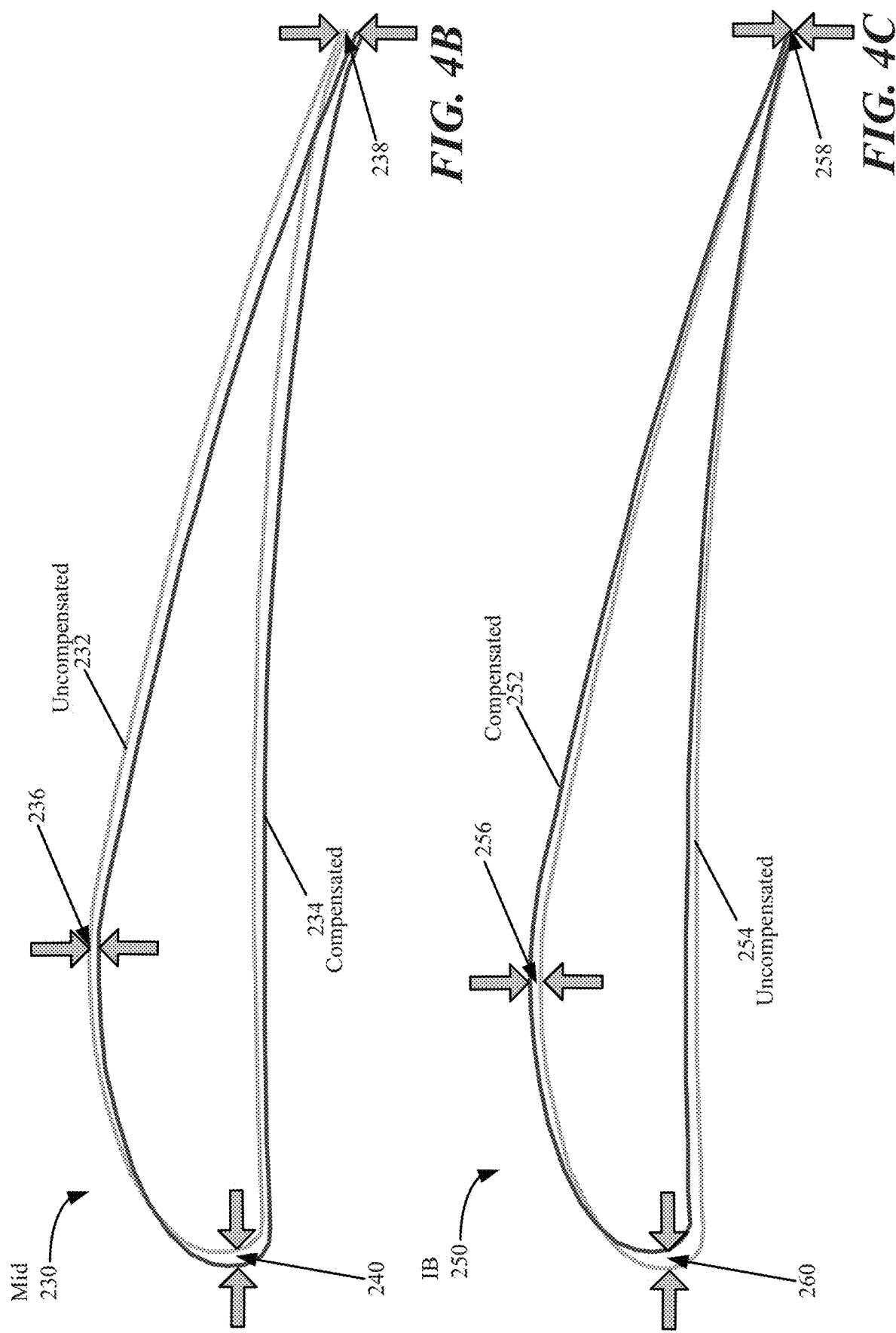

WING FLAP DEFLECTION CONTROL REMOVAL

TECHNICAL FIELD

This disclosure generally relates to wings for airplanes. More specifically, this disclosure relates to a flap for wing.

BACKGROUND

Modern aircraft, such as large passenger jets, need to operate at various speeds, including a lower speed during take-off and landing and higher speed during cruise. At lower speeds, additional lifting surfaces, also known as high-lift devices such as a trailing edge flap, are sometimes needed to generate the required lift. These additional lifting surfaces are often designed to be stowed at higher speed to minimize the drag at cruising speed and deployed when needed at lower speed during takeoff and landing. When the various lifting surfaces are deployed, their shape and relative motion are designed to generate the lift together efficiently.

During flight, such as cruise conditions, a wing and a trailing edge flap experience loads which cause the wing and the flap to bend and twist. The internal structural design of the wing and flap differ. Further, bending loads from the wing are transferred to the flap at discrete locations, such as the flap support mechanism that allows the flap to be deployed and/or deflected. Because the internal structures are different and the load distributions differ, the wing and flap bend and twist differently from one another during flight.

The mismatch in the deflection and twist between the wing and the flap can cause geometry variations that reduce aerodynamic performance of the wing. This issue can be resolved by mechanically forcing the flap into a certain shape. However, mechanical solutions introduce weight penalties and additional costs, which are undesirable. In view of the above, methods and apparatus are needed that reduce geometry variations between the wing and the flap as a result of different loading and structural conditions during flight.

SUMMARY

A methodology for designing high-lift device surfaces is discussed. The high-lift device surfaces can include but are not limited to ailerons, flaperons, spoilers, rudders, elevators, slats and flaps. In one example embodiment, a flap and associated method of designing the flap are described. The flap can be attached to a fixed portion of a wing on an airplane. The method can involve selecting initial shapes of the flap and wing and then determining the deflections of the wing and flap at selected conditions, such as cruise conditions when the flap is in a particular position and the plane is at a particular weight. At the selected conditions, new wing and flap shapes can be predicted using numerical simulations and analysis.

After the new shapes of the wing and flap are determined at the selected conditions, the flap shape can be examined to determine whether the flap satisfies specified constraints, such as geometric and sealing constraints. Also, the relative spacing between wing and flap can be considered at different conditions, such as when the flap is deployed to meet aerodynamic requirements at low speeds.

When the new shape of the flap doesn't satisfy the specified constraints, a second initial shape of the flap can be predicted, such as by bending, twisting or flattening the initial shape, then a second new shape can be determined at the specified flight conditions. This process can be repeated in an iterative manner until all the constraints are determined to be satisfied.

On the final iteration, a final initial shape can be determined and a final new shape can be determined at the specified flight conditions. When the final new shape is determined to satisfy the specified requirements, the final initial shape can be designated as the shape to which the flap will be manufactured. For a flap formed from a composite material, the manufactured (as-built) shape can be referred to as the jig shape. This approach allows a desired shape to be obtained at cruise conditions without having to mechanically deform the flap.

One aspect of the invention can be generally characterized as an aerodynamic system for an aircraft. The system can include a fixed portion of a wing, a seal coupled to and extending from the fixed portion of the wing and a high-lift device surface coupled to the wing having an as-built shape (jig-shape). While not in flight, the high-lift device surface in the as-built shape partially makes contact with the seal such that air can flow between the seal and the high-lift device surface. At one or more flight conditions, the high-lift device surface deforms under aerodynamic forces from the as-built shape to a second shape such that in the second shape the high-lift device surface fully contacts the seal to prevent air flow between the seal and the high-lift device surface.

In particular embodiments, the one or more flight conditions can include a cruise condition. Further, the as-built shape can be bowed such that it produces the desired shape under the aerodynamic forces. Also, the as-built shape can be twisted such that it untwists under the aerodynamic forces. In addition, a loft of the as-built shape can be increased such that the high-lift device surface flattens and lengthens under the aerodynamic forces.

In another aspect, the invention can be characterized as a method of generating a high-lift device surface for a wing. The method can include 1) determining a shape of a fixed portion of a wing and as-built shape of a high-lift device surface where the high-lift device surface is mechanically coupled to the wing such that it can move relative to the wing and where a seal is interposed between the fixed portion of the wing and the high-lift device surface that prevents air flow between the seal and the high-lift device surface at a flight condition; 2) determining a first structure and first materials of the wing and a second structure and second materials of the high-lift device surface; 3) and specifying the flight condition. The as-built shape of the high-lift device surface can be shaped to aeroelasticly deform from a first shape while not in flight to a second shape in flight. In the first shape, gaps exist between the high-lift device surface and the seal. In the second shape the gaps between the high-lift device surface and the seal are removed as a result of an aeroelastic deformation that occurs at the flight conditions.

BRIEF DESCRIPTION OF THE DRAWINGS

Figure 1:
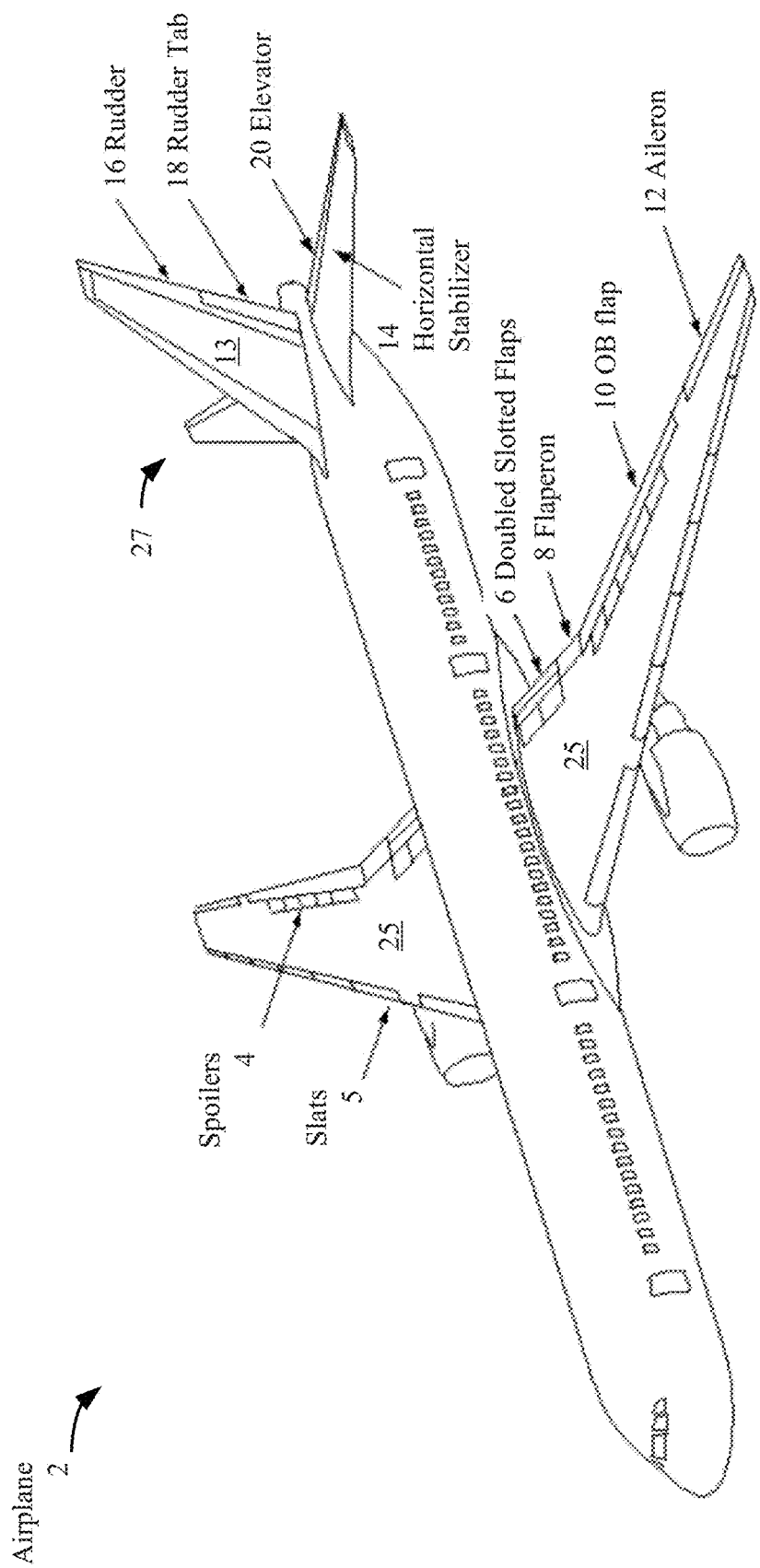

Having thus described examples of the disclosure in general terms, reference will now be made to the accompanying drawings, which are not necessarily drawn to scale, and wherein like reference characters designate the same or similar parts throughout the several views, and wherein:

FIG. 1 is a perspective view illustrating an airplane and aerodynamic high-lift device surfaces, according to one aspect of the present disclosure.

Figure 2:
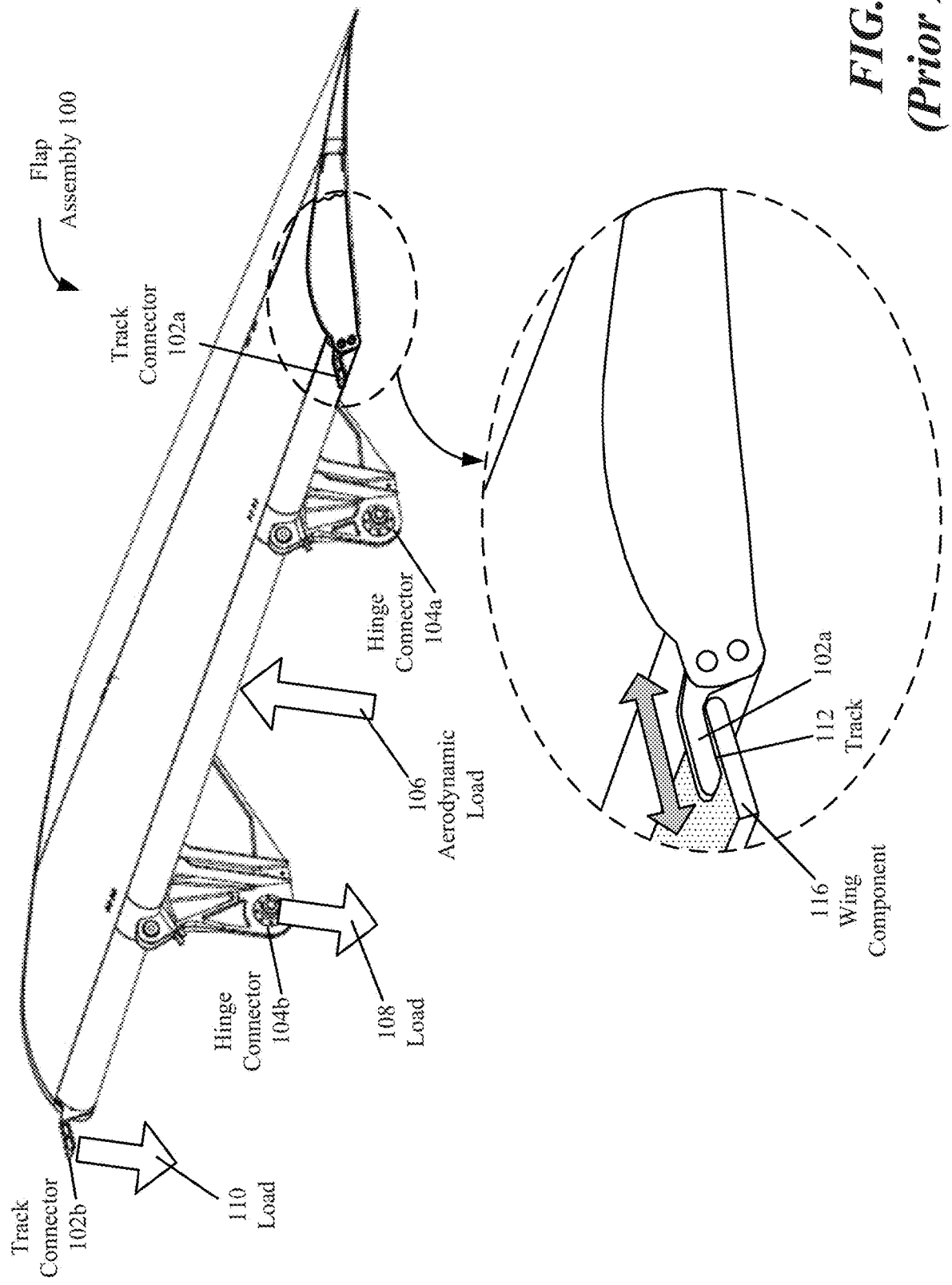

FIG. 2 is a perspective view of a prior art trailing edge flap, according to one aspect of the present disclosure.

Figure 3:
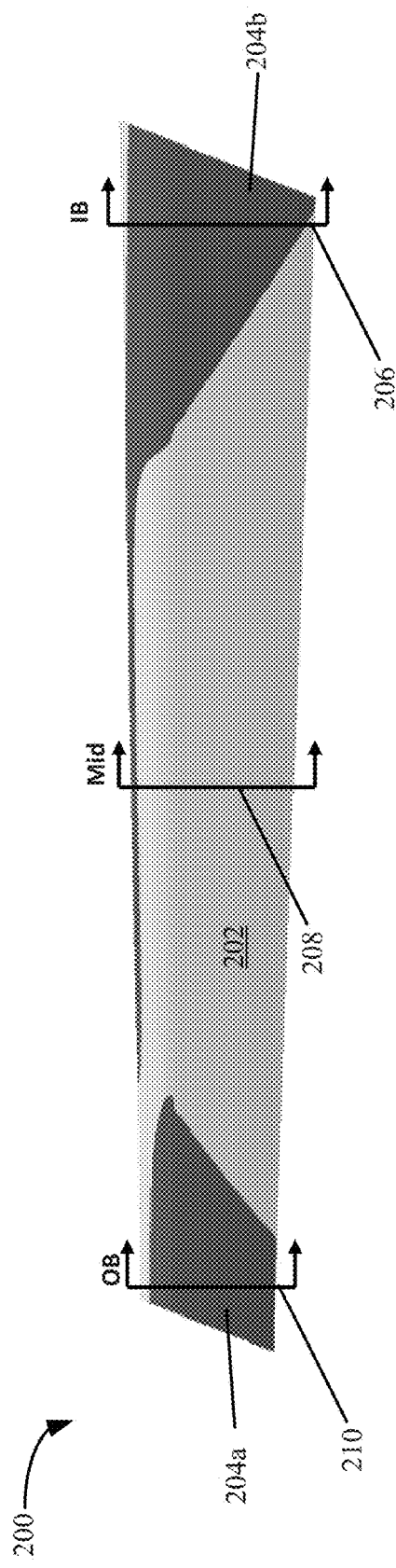

FIG. 3 is a plan view of two flaps where the manufactured shape of one of the flaps has been adjusted to account for deformations that occur at cruise conditions, according to one aspect of the present disclosure.

Figure 4A:
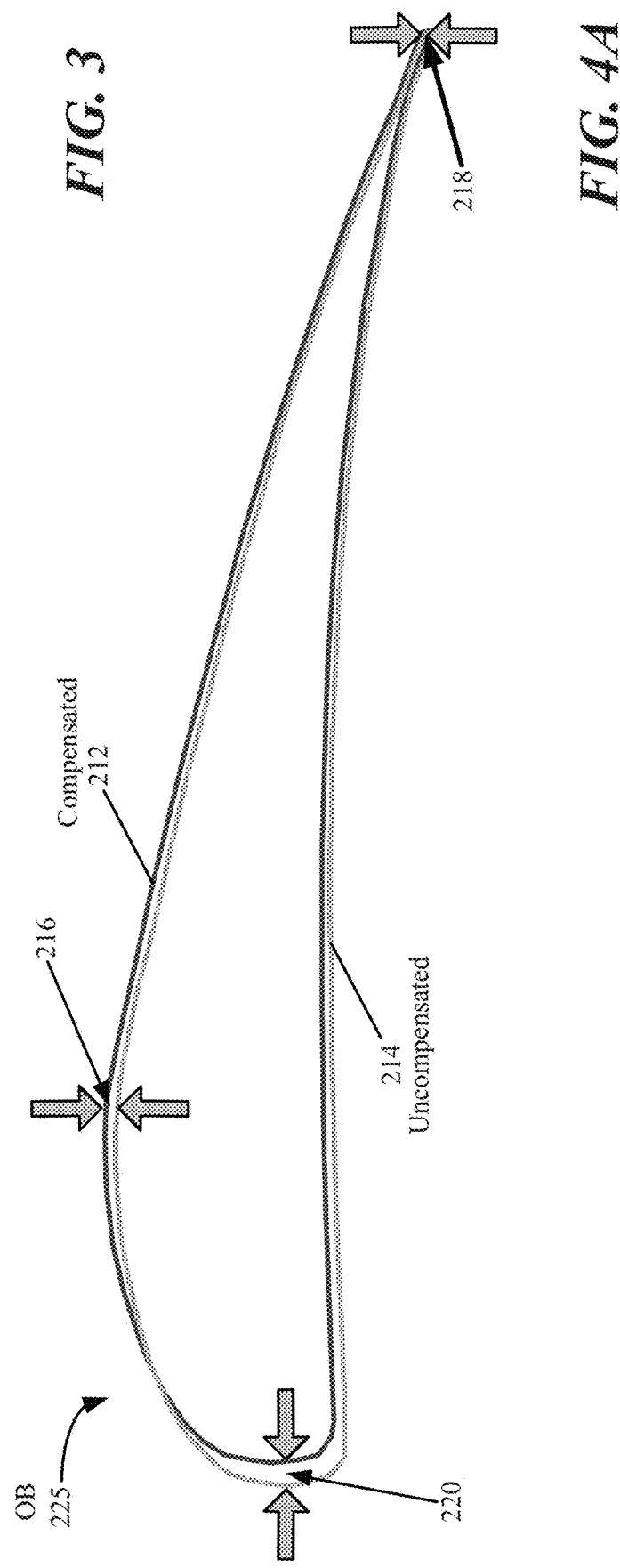

FIGS. 4A, 4B and 4C are cross sections showing a shape of the two flaps shown in FIG. 3 at three different locations, according to one aspect of the present disclosure.

Figure 5A:
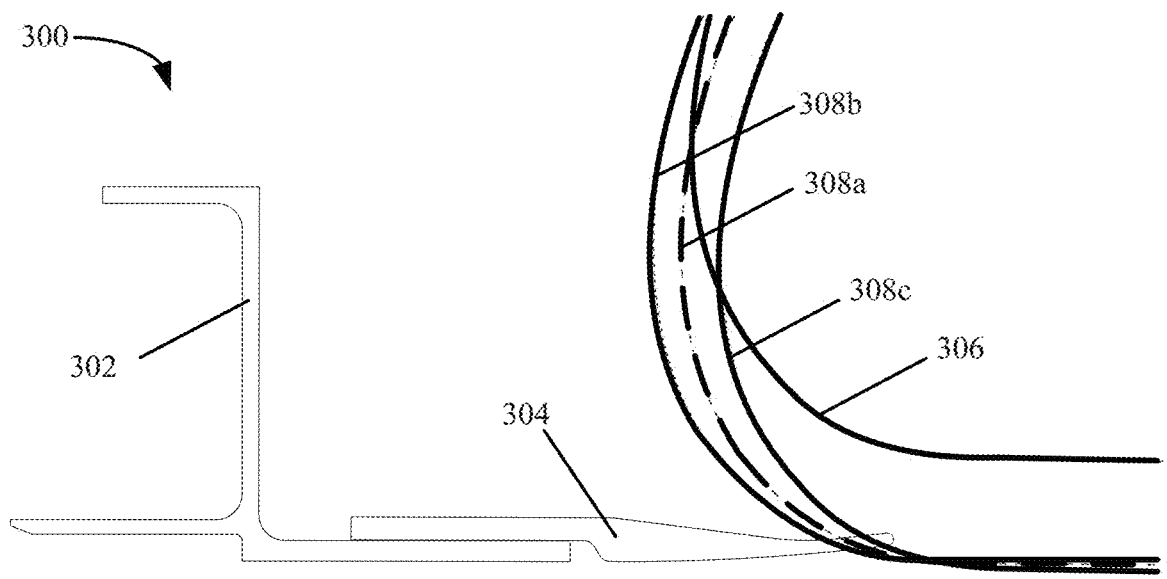
Figure 5B:
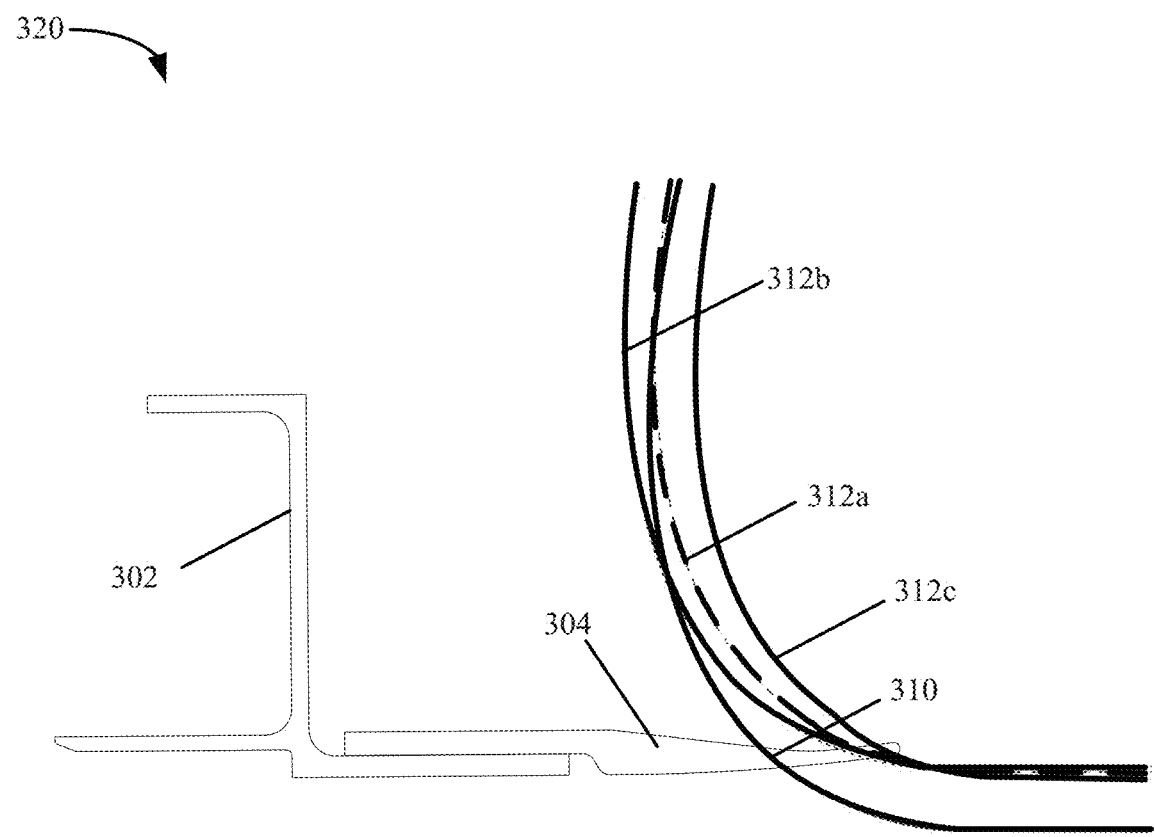

FIGS. 5A and 5B are cross sections at two different locations showing shapes of the leading edge of a flap at different flight conditions compared to an as-built shape, according to one aspect of the present disclosure.

Figure 6:
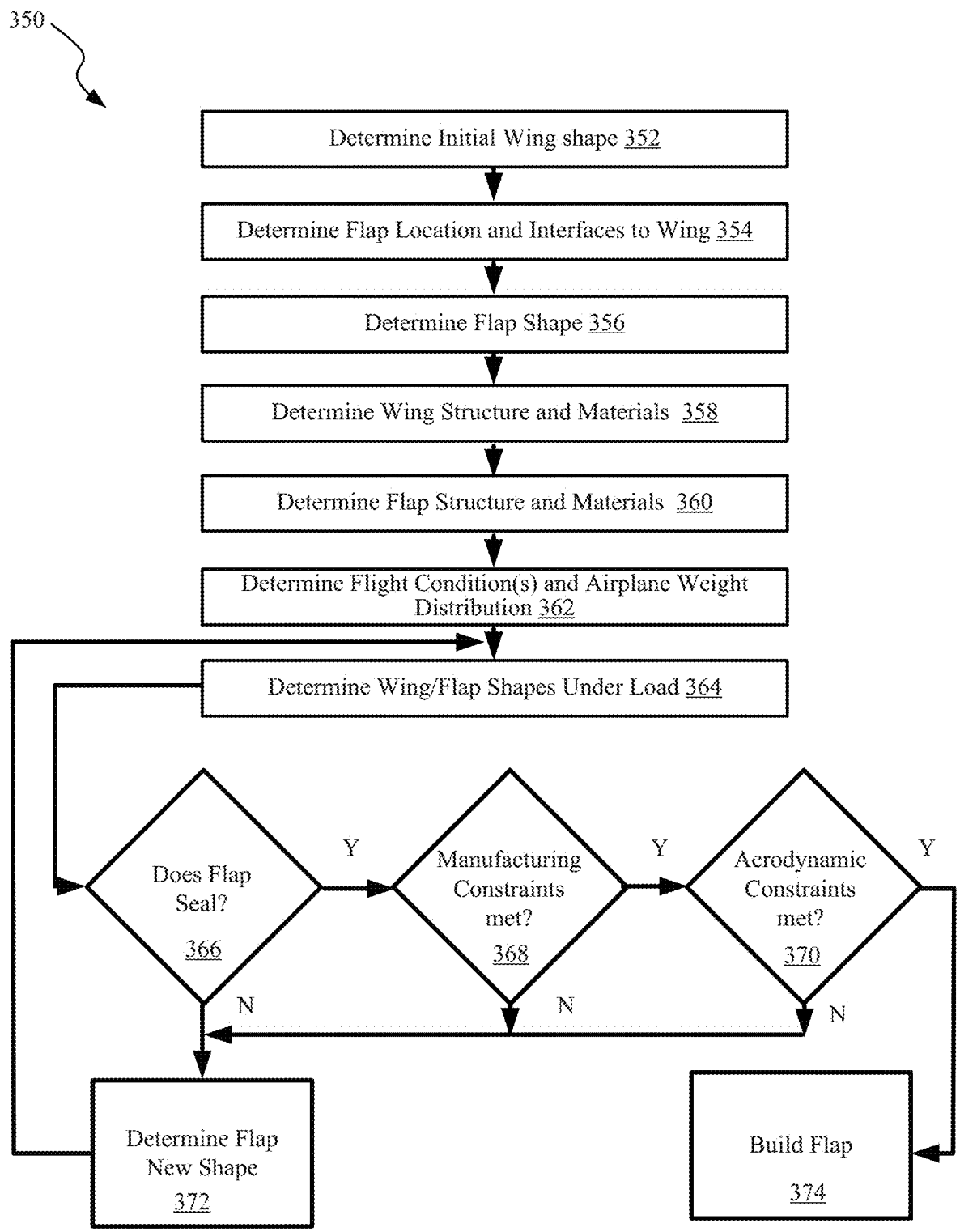

FIG. 6 is block diagram of a flap design methodology, according to one aspect of the present disclosure.

Figure 7:
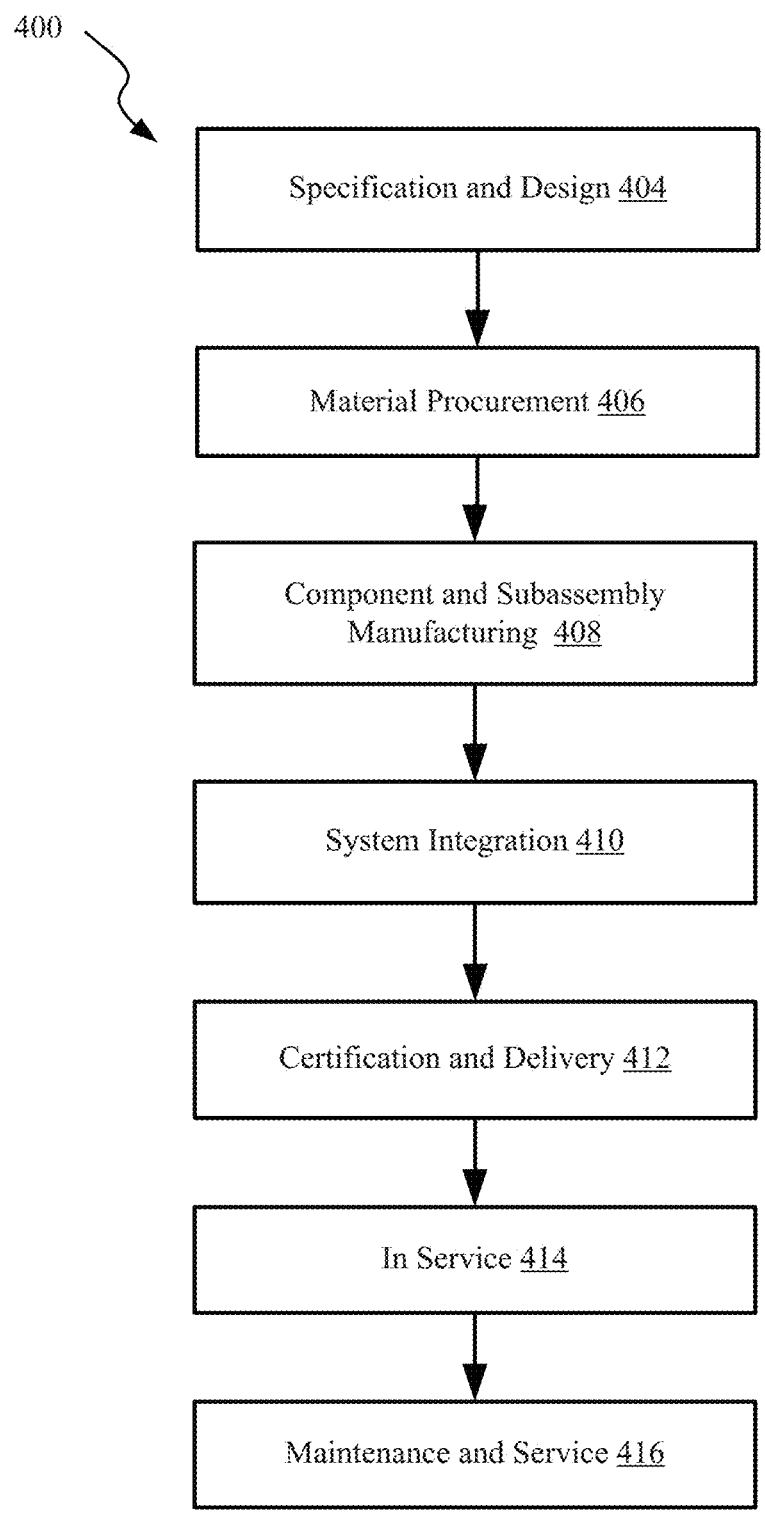
Figure 8:
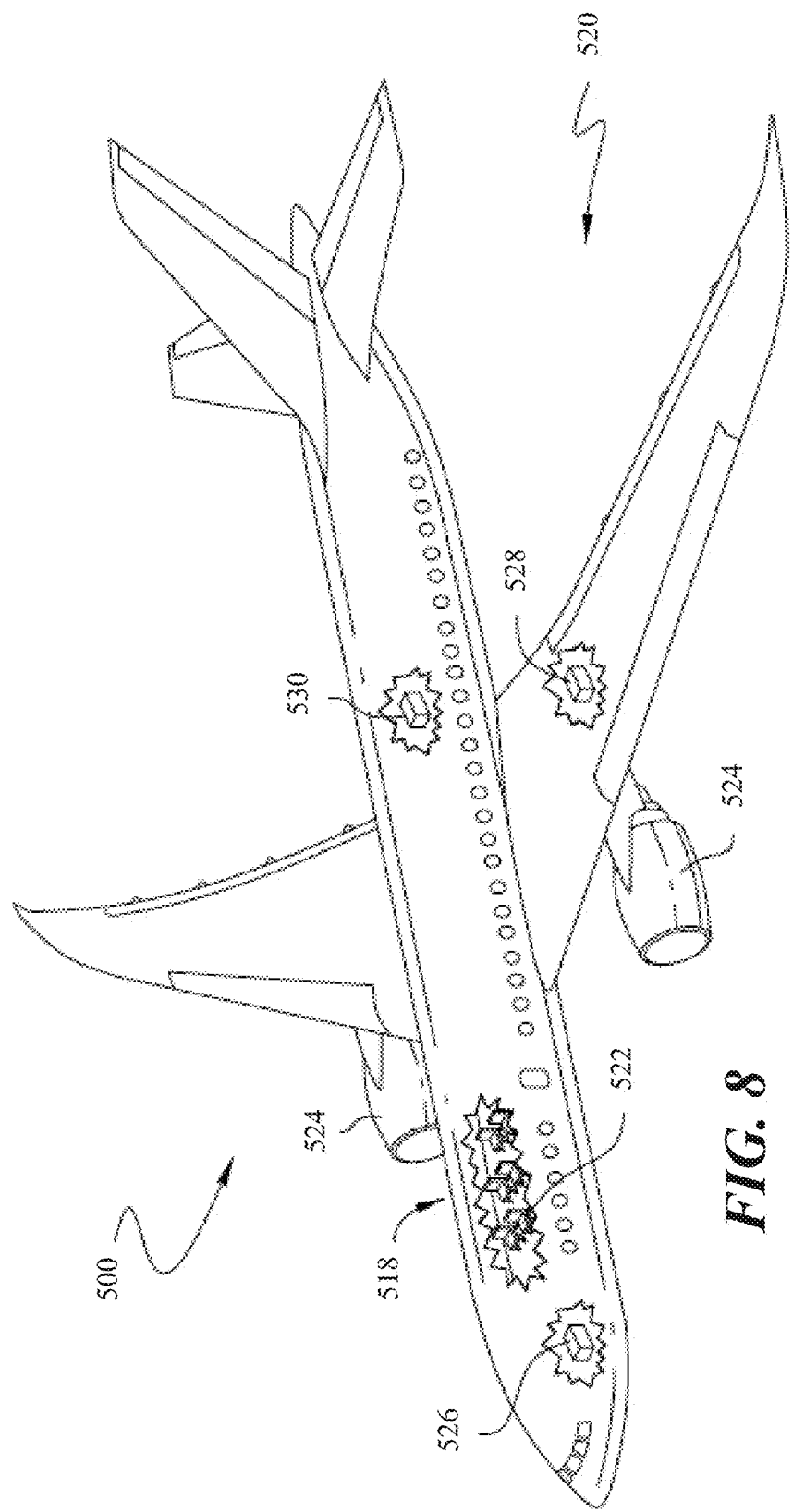

FIG. 7 is a block diagram of an aircraft production and service methodology that may utilize the flaps described with respect to FIGS. 1-6, according to one aspect of the present disclosure FIG. 8 is a schematic illustration of an aircraft that may utilize a flap in accordance with FIGS. 1-6, according to one aspect of the present disclosure.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Introduction

A methodology for designing high-lift device surfaces on an airplane, such as a jet airplane, is described. In one embodiment, the methodology is described in the context of designing a trailing edge flap on the wing of a jet. In the method, an as-built shape of the flap is determined in anticipation of an expected deformation of the flap for a specific flight condition. The in-flight shape of the flap is determined based upon an analysis that takes into account the specified flight conditions, a weight and weight distribution of the airplane, a structure of the wing, a structure of the flap and predicted aerodynamic loads. The design methodology allows a flap to be built and used on an airplane which doesn't require a mechanical system to force the flap into a desired shape during flight. The elimination of the mechanical system allows the weight of the aircraft to be reduced, simplifies the design of the aircraft and results in lower recurring airplane cost.

In more detail, an airplane and aerodynamic high-lift device surfaces used on an aircraft are described with respect to FIG. 1. With respect to FIG. 2, a perspective view of a prior art trailing edge flap is discussed. With respect to FIGS. 3, 4A, 4B and 4C, the shapes of two flaps are described. In particular, the as-built shape of one of the flaps has been adjusted to account for deformations that occur at cruise conditions.

FIGS. 2-4C are associated with a Boeing 777x configuration. However, this example is provided for the purposes of illustration only. The articles of manufacture and the methodologies described herein can be used with many different types of modern aircraft. These aircraft can have a different number of flaps and flap configurations. Hence, the example is not meant to be limiting.

With respect to FIGS. 5A and 5B, the shapes of the leading edge of a flap at different flight conditions are compared to an as-built shape of the flap. The as-built shape is designed to anticipate aeroelastic effects that occur during flight. A flap design methodology that anticipates aeroelastic effects is discussed with respect to FIG. 6. With respect to FIG. 7, an aircraft production and service methodology that may utilize the flaps described with respect to FIGS. 1-6 is described. Finally, with respect to FIG. 8, a schematic illustration of an aircraft that may utilize a flap in accordance with FIGS. 1-6 is discussed.

Aircraft High-Lift Device Surfaces and a Prior Art Flap Design

FIG. 1 is a perspective view illustrating an airplane 2 and its associated aerodynamic high-lift device surfaces. On the wings 25, slats 5 are used near the leading edge of each wing. Near the trailing edge, spoilers 4, doubled slotted flaps 6, flaperon 8 and OB flap 10, and an aileron 12 are provided on each wing. As noted above, this flap configuration is provided for the purposes of illustration only and is not meant to be limiting. The high-lift device surfaces, such as the flaps 6, can be configured to articulate in some manner, relative to the wings 25.

The empennage 27 is provided with a vertical stabilizer 13, rudder 16 and rudder tab 18. The horizontal stabilizer 14 is provided with an elevator 20. The rudder 16 and rudder tab 18 can be configured to move relative to the vertical stabilizer and the elevator can be configured to move relative to the horizontal stabilizer.

The configuration above is associated with an existing Boeing 777™ configuration. A Boeing 777x configuration includes a single slotted flap. The 777x configuration includes three flaps per wing whereas other configurations include only two flaps per wing. A flaperons provides high lift and roll control. On some aircraft the flaperons is an inboard aileron. On a Boeing 737, there is no flaperons/IB aileron. Instead, the flaps come together for this wing. Thus, the wing example described herein is provided for the purposes of illustration only and is not meant to be limiting.

In one embodiment, the wings can include trailing edge variable camber system. The trailing edge variable camber system includes a drooping spoiler and flap mechanism. The trailing edge variable camber system can provide a range of aerodynamically sealable flap and spoiler positions at cruise conditions. It can slightly adjust the flap in flaps up (cruise) position to optimize fuel burn as the aircraft flies through its mission by adjusting the spanwise lift distribution. The ability of a flap in a trailing edge variable camber system to seal under different cruise condition is described below with respect to FIG. 5.

FIG. 2 is a perspective view of an example of flap assembly 100. The flap assembly 100 is configured to be coupled to a trailing edge of a wing, such as wings 25. The flap assembly 100 is coupled to the wing via hinge connectors, such as 104a and 104b. When coupled to a wing, the hinge connectors are covered by a fairing (not shown).

During flight, the flap assembly 100 can rotate about the hinge connectors as well as other rotation points (not shown) built into the flap assembly 100 to adjust a position of the flap relative to the fixed portion of the wing. Typically, the flap assembly 100 is configured to move through its greatest range of motion at take-off and landing. However, the flap assembly 100 assembly may also allow a position of the flap to be adjusted at cruise conditions. This capability allows for improved aerodynamic efficiency over a greater range of cruise conditions. For example, as described above, the flap assembly 100 can be part of a trailing edge variable camber system, which provides for a number of different flap positions at cruise conditions.

During flight, forces from a number of different sources act on the flap assembly 100.

For example, the flap assembly 100 experiences aerodynamic loads, such as 100, which vary according to a position of the flap, the orientation of the airplane and the flight conditions. Further, the flap assembly 100 receives loads via its two discrete connection points to the wing, such as via hinge connector 104a and 104b.

During flight, a shape of the wing changes as the aerodynamic loads and the weight of the plane changes. For example, the wing can bend and twist. Further, the wing can unbend and untwist as the aerodynamic loads change from flight condition to flight condition. As the wing changes shape, the loads transferred to the flap assembly 100 via the hinge connectors change.

Generally, the flap assembly 100 has a different internal structure than the fixed portion of the wing to which it is attached. The differences in internal structure result from such factors as the shape of the flap, which tapers to a small radius of curvature at its trailing edge, its location on the wing, the greater aerodynamic loads it experiences as a result of its ability to change position and the mechanical supports needed for the rotation and attachment mechanisms at its attachment points to the wing. Often, the flap assembly 100 can be mechanically stiffer or softer than the fixed portion of the wing.

Under flight conditions, the differences in the flap internal structure as compared to the fixed portion of the wing and its discrete attachment points causes the shape of the flap to change differently as compared to the fixed portion of the wing. For example, because the flap is attached to the wing at only two attachment points and it has different stiffness than the fixed portion of the wing, the flap assembly 100 may not bend or twist in the same way as the fixed portion of the wing. These differences can cause local shape discontinuities which reduce the aerodynamic performance of the wing. For example, step discontinuities can occur at the flap-wing interface. As another example, the flap may not seal properly resulting in gaps which allow air to flow between the leading edge of the flap and the trailing edge of the wing. When the flap is improperly sealed or has step discontinuities in its structure, the drag increases, which results in increased fuel consumption.

In prior art designs, to help the flap assembly 100 maintain a desired shape, additional mechanical attachment points can be provided between the fixed portion of the wing and the flap assembly 100. In FIG. 2, two track connectors 102a and 102b are provided. The track connectors 102a and 102b extend from the flap assembly 100 and each interface with roller connections to the fixed portion of the wing, such as 112 on wing component 116. As the position of the flap changes, the track connectors move along the track.

The track/roller connectors introduce additional loads to the flap, which cause the flap to maintain a desired shape, during various operating conditions of the airplane to which it is attached. For example, the track/roller connector can force the flap to remain close to a seal. A drawback of the track/roller connectors is the additional weight added to the airplane and the additional complexity of a wing including these connectors. The additional weight and complexity also increase costs. For example, the track connectors and tracks can add about one hundred pounds to the weight of the airplane. As will be described as follows with respect to FIGS. 3-6, a wing, including a flap assembly, is described that doesn't include the track connectors.

Flap Design Methodology

In this section, a wing including a variable position flap is described. In one embodiment, the flap can be associated with a trailing edge variable camber system. Hence, the position of the flap can be adjustable at cruise conditions. The jig shape (manufactured shape) of the flap can be selected so that when the flap is loaded at cruise conditions it changes to a second desired shape. For example, the jig shape can be twisted and bent in the spanwise direction to anticipate the aeroelastic bending and twisting which occurs during flight to achieve a flap which properly seals in flight. Using this approach, in one embodiment, the track connectors, as described with respect to FIG. 2, can be eliminated. A methodology for manufacturing such a flap is described as follows with respect to FIG. 3.

FIG. 3 is a top view 200 of two flaps which illustrate as-built shape tweaks to account for deformation that occurs at cruise conditions. The two flaps are placed over the top of one another. The first flap is indicated by the section 202, which is lighter than the surrounding regions. The second flap is indicated by the dark regions, 204a and 204b.

The first flap is not designed to anticipate aeroelastic effects in flight. To provide the second shape, the shape of the first flap has been deformed, such as bent, twisted and/or flattened, to account for anticipated aeroelastic effects. The border between the light and the dark regions is where the heights of the first flap and the second flap are equal. In the section 202, the height of the first flap is higher than the second flap. In the dark regions, 204a and 204b, the height of the second flap is higher than the first flap. The differences in the heights result from the deformation of the first flap shape to obtain the second flap shape.

From the inboard (IB) line 206, through the midline 208 and to the outboard (OB) line 210, the first flap can be essentially aligned with a line. In comparison, portions of the second flap can follow a curve where the second flap can be considered bowed downward in the middle portion as compared to the first flap. Hence, the height of the first flap is greater than the second flap near the midline 208 and lower than the height of the second flap near the ends, such as near the IB line 206 and the OB line 210.

The as-built shape of the first flap doesn't anticipate the aeroelastic loads the first flap is exposed to during flight conditions, such as cruise. During the flight, the first flap can deform. As described above with respect to FIG. 2, in a traditional system, to ensure the first flap's shape is satisfactory in flight, a deflection track system can be used. The deflection track system introduces mechanical loads which cause the first flap to deform in a desired way in flight. For example, the track system can be used to ensure the first flap properly seals at cruise conditions.

In contrast, the second flap doesn't require a deflection track system. The as-built shape of the second flap is designed such that it deforms, at specified flight conditions, to a new desired shape. For example, the shape of the second flap can be designed such that at cruise conditions in a range of positions, the second flap is properly sealed to the fixed wing portion. In other example, the second flap can also be shaped to improve low speed aerodynamic performance of the wing. To further illustrate the differences between the first flap and the second flap, cross sectional curves at each of the IB line 206, the midline 208 and the OB line 210 are described as follows with respect to FIGS. 4A, 4B and 4C.

FIGS. 4A, 4B and 4C are cross sections of the two flaps shown in FIG. 3. The first flap and the second flap shapes can represent the as-built shapes of the flaps prior to attachment to the fixed portion of a wing. In FIG. 4A, which shows the shapes 225 at the OB line 210, the cross sectional curve associated with the first flap is referred to as uncompensated flap 214 as it has not been compensated to account for the aeroelastic loads that occur during flight. In contrast, the cross sectional curve associated with the second flap is referred as the compensated flap 212 as its shape has been selected to anticipate aeroelastic deformations which occur under load conditions, such as the load conditions associated with cruise flight.

At the trailing edge, the compensated flap 212 and the uncompensated flap have the same chord length. At the leading edge the uncompensated flap 214 extends more forward than the compensated flap 212. In one embodiment, the leading edge of the flap can be selected to improve low speed aerodynamic performance.

Some differences in the two cross sectional curves are illustrated at locations 216, 218 and 220. The distance between the two curves at location 216 is about 0.27 inches. In one embodiment, the distance is between 0 and 0.5 inches. The difference in the two curves near the trailing edge location 218 is about 0.1 inches. In one embodiment, the distance is between 0 and 0.5 inches. Finally, leading edge of the compensated flap 212 is more round as compared to the uncompensated flap and the distance between the two curves is about 0.55 inches. In one embodiment, the distance is between 0 and 1 inch.

FIG. 4B shows the cross sectional curve profiles 230 of the flaps at the midline 208. At the midline, the height of the uncompensated flap 232 is now higher as compared to the compensated flap 234. The width of the compensated flap 234 is also longer as the leading edge of the compensated flap 234 extends farther than the uncompensated flap. At the trailing edge 238, the flaps are about 0.58 inches apart. In one embodiment, the distance is between 0 and 1 inch. Further, at location 256, the flaps are about 0.34 inches apart. In one embodiment, the distance is between 0 and 1 inch. At the leading edge location 240, the flaps are about 0.49 inches. In one embodiment, the distance is between 0 and 1 inch.

FIG. 4C shows cross sectional curve profiles for the compensated flap 252 and uncompensated flap 254 at the D3 line 206. The compensated flap 252 is again higher than the uncompensated flap 254. At the leading edge, the uncompensated flap 254 extends farther and lower than the compensated flap 252. At the trailing edge, the compensated and uncompensated flaps are close to one another.

At the leading edge 260, the flaps are about 0.7 inches apart. In one embodiment, the distance is between 0 and 1.5 inches. At location 256, the flaps are about 0.45 inches apart. In one embodiment, the distance is between 0 and 1 inch. At the trailing edge, the flaps are about 0.018 inches apart. In one embodiment, the distance is between 0 and 0.5 inches. These numbers are provided for illustrative purposes only and are not meant to be limiting as the numbers can vary depending on what materials are used to construct the wing and the flap, the location of the flap on the wing, the size of the wing and the flap, the weight of the airplane, the cruise conditions selected, the connection locations of the flap to the wing and the internal structure of each of the wing and the flap.

In the previous paragraphs, the dimensions are provided for the purposes of illustration only and are not meant to be limiting. The dimensions are predictions based upon simulations. Further, the dimensions are application specific and can vary significantly depending on the stiffness and size of wing or other aerodynamic surface to which the methodologies described herein are applied.

FIGS. 5A and 5B are cross sections at two different locations comparing shapes of the leading edge of a flap at different flight conditions to the as-built shape. The as-built shape corresponds to the compensated shape described above with respect to FIGS. 3, 4A, 4B and 4C. In this example, the as-built shape has been selected to anticipate aeroelastic forces that can occur during flight. The as-built shape can also represent the shape of the flap under unloaded conditions, such as when a plane including the flap is on the ground. The flap can be configured in a retracted position and an unretracted position. In one embodiment, the flap can be in a retracted position while on the ground.

In the FIGS. 5A and 5B, the as-built shape is compared to the shapes of the flap at 1 g level cruise conditions. The flap can be used as part of a trailing edge variable camber system. Thus, at cruise conditions, the flap shape is analyzed through the range of motion of the trailing edge variable camber (TEVC) system.

In FIG. 5A, leading edge flap shapes, 308a, 308b and 308c, at the OB line 210 (See FIG. 3) are compared to the as-built shape 306. Results similar to view 300 shown in FIG. 5A are also predicted at the IB line 206. The leading edge flap shapes, 308a, 308b and 308c correspond to three positions of the flap in a trailing edge variable camber system. In particular, curve 312b is flap up, 312c is flap down and 312a is nominal position. The flight conditions are one g cruise (the plane is not climbing or descending) at a specified altitude, plane weight and weight distribution. The weight distribution can depend on how many people, how much cargo and how much fuel the plane is selected to carry and the locations on the plane where the mass is located.

In FIG. 5A, the flap shapes are shown positioned relative to a seal 304, which is coupled to a support 302 in the trailing edge of the wing. As described above, it can be important for a flap to properly seal at some conditions, such as nominal cruise condition, to maintain aerodynamic performance. For example, at cruise conditions, air flow between the trailing edge of the wing and the leading edge of the flap can increase the drag and fuel consumption. Hence, proper sealing is desired.

Under unloaded conditions, such as on the ground, the as-built shape 306 doesn't meet the seal 304. In the case where a high-lift device surface can retract and unretract, this unsealed condition can occur when the as-built shape 306 is in a retracted state. This differs from the traditional flap design shown in FIG. 2 where the mechanical track system forces the leading edge to meet the seal at this location. The shapes, 308a, 308b and 308c, at the three different shown TEVC positions at cruise are forced downward as compared to the as-built shape and meet the seal. Thus, the aerodynamic performance is preserved at these selected flight conditions.

In FIG. 5B, the as-built flap shape 310, at unloaded conditions, such as on the ground, and the shapes of the flap, 312a, 312b and 312c, at the three different cruise conditions are shown in view 320 positioned relative to the seal 304 at the midline 208 (see FIG. 3). The as-built flap shape 310 seals at the midline. At cruise conditions, the flap extends less of a distance into the seal 304 as compared to the unloaded flap. However, the flap meets the seal 304 at each of the cruise conditions.

As shown with respect to FIG. 5A, the unloaded flap didn't seal at the IB and OB ends. Thus, when unloaded, as the distance from the midline increases, the unloaded flap moves away from the seal 304 until eventually contact is lost. Thus, the unloaded flap makes a partial seal when unloaded. As shown in FIGS. 5A and 5B, when unloaded, the flap bows downwards towards at the midline and extends upwards at the ends (OB and IB lines). Thus, when unloaded and a neutral position where the flap is not deflected, a portion of the flap can extend above the trailing edge of the wing adjacent to the flap.

As a result of the aeroelastic effects at the cruise conditions, the flap moves downwards at the two ends and upwards in the middle portion, i.e., it straightens out. Thus, the flap meets the seal fairly evenly across the length of the flap. If the flap shape had not been compensated for aeroelastic effects, i.e., the initial shape is flat unloaded, then at the cruise conditions, the flap would bow upwards in the middle and downwards at the midline. Thus, a seal would not be obtained at cruise.

In a particular embodiment, a method of using a high-lift device surface and sealing mechanism can comprise 1) on an airplane in which the high-lift device surface and sealing mechanism are installed, operating the airplane at a first flight condition where the high-lift device surface receives first aerodynamic loads such that the high-lift device surface takes on a first shape that doesn't seal against the sealing mechanism or partially seals against the sealing mechanism, 2) operating the airplane at a second flight condition where the high-lift device surface receives second aerodynamic loads such that the high-lift device surface takes on a second shape that forms a seal with the sealing mechanism. In particular embodiments, the first flight condition can occur prior to take-off, during take-off, during landing or after landing. In another embodiment, the second flight condition can occur during a cruise condition. In yet another embodiment, the high-lift device surface is installed on a wing of the airplane. In a further embodiment, the high-lift device surface takes on a plurality of shapes between the first shape and the second shape as the flight conditions continuously change from the first flight condition to the second flight condition. Next, a method of designing a flap, such as the flap described above with respect to FIGS. 5A and 5B, is discussed with respect to FIG. 6.

FIG. 6 is block diagram of a flap design methodology 350, according to one aspect of the present disclosure. In 352, an initial wing shape is determined. The initial wing shape can be based upon initial design specifications for an airplane, performance requirements and aerodynamic simulations. In some instances, the three dimensional initial wing shape may be initially specified as a continuous component without any of the high-lift device surfaces modeled or the high-lift device surfaces only partially specified. The aerodynamic simulations used to design the initial wing shape may cover a range flight conditions from take-off and landing to cruise conditions.

In 354, a flap size and location on the initial wing can be specified. If the initial wing shape is continuous and doesn't include high-lift device surfaces, a section of the initial wing can be removed to accommodate the flap. Further, attachment interfaces and their locations can be specified. The attachment interfaces includes the hardware that allow the flap to be attached to the wing and move relative to the wing. For example, in FIG. 2, the flap is shown as having two hinge connectors which allow the flap to be attached the fixed portion of the wing. The location of the hinge connectors and their associated structure are also shown in FIG. 2.

Also, a range of motion of the flap can be specified. The range of motion can affect the design of the attachment interfaces, such as the distance of the axis about which the flap rotates from the bottom of the flap and a fairing on the wing that is needed to accommodate the flap assembly. When the flap is used in a trailing edge variable camber system, the range of motion can also include flap positions associated with this system. As described above, the as-built flap shape can be designed to make sure flap seals properly in the different positions associated with a trailing edge variable camber system.

In 356, an initial flap shape can be selected. For example, the initial flap shape can be selected to generally follow the shape of the wing where the flap was removed. The trailing edge of the fixed portion of the wing adjacent to the leading edge of the flap can be a relatively flat vertical surface. However, the leading edge of the flap, as described above, can be rounded. The leading edge of the flap can be shaped to improve the aerodynamic performance of the flap. The uncompensated flap in FIGS. 3, 4A, 4B and 4C, is illustrative of an initial flap shape that might be utilized.

In 358, the wing structure and materials can be specified. The wing structure can include a specification of such components as the skin, ribs, spars and stringers and their associated locations. Materials, such as Aluminum (metals in general), composites or combinations thereof, can be used to construct the wing. The wing structure affects how much the wing will twist and bend under the applied aerodynamic loads. The specified wing structure and materials can be used in a finite element analysis to determine the deformation of the flap under the aerodynamic loads.

In 360, the flap structure and materials can be specified in a similar manner as to the wing. The internal structure of the flap is different from the wing because of such factors as it is designed to move, it doesn't carry fuel, it experiences different loads than the wing and it attaches to the wings at discrete locations. Thus, the stiffness of the flap can be different than the wing. Hence, its aeroelastic response is different than the wing. The specified flap structure and materials can be used in a finite element analysis to determine the deformation of the flap under the aerodynamic loads.

In 362, one or more flight conditions and airplane weight distributions can be specified. These conditions affect the aeroelastic response of the wing and the flap. In particular, the magnitude of the aeroelastic response can vary from condition to condition. Simulations and experimental testing can be done at a number of different conditions to determine whether the aeroelastic of the flap is satisfactory within a desired operational envelope.

As an example, the typical cruise speed for a Boeing 777 is about Mach 0.84 (554 MPH) at a cruise altitude of 35,000 ft. The operating empty weight, depending on the model, can vary between 300,000 to 400,000 pounds. The maximum takeoff weight, depending on the model, can vary between 545,000 and 775,000 pounds. The maximum landing weight, depending on the model, can be between 445,000 and 557,000 pounds. Thus, for any particular airplane model, a fuel and cargo load at particular flight conditions can be specified as part of a testing envelope for a wing and flap.

In 364, the wing and flap shapes at the specified flight conditions can be determined. For example, the specified flight conditions can be cruise with the plane loaded to some weight greater than its empty weight. A numerical simulation of the aerodynamic loads on the wing and flaps can be determined and then an amount of deformation of the wing and flap can be determined. As described above, the amount of deformation depends on such factors as the aerodynamic loads, the weight of the plane, the structure of the wing and flap and the initial unloaded three dimensional shape of the wing and the flap.

In some embodiments, this process can be repeated a number of times as the aerodynamic loads can change as the wing and flap deform. For example, based on the aerodynamic loads determined using the initial shape of the wing and flaps, a second shape of the wing and flaps can be determined. Then, using the second shape of the wing and flaps, new aerodynamic loads can be determined. Based upon the new aerodynamic loads, a deformation of the second shape to a third shape can be determined. This iterative process can be repeated until the shape of the wing and flap converge to a particular shape at a particular set of conditions.

This process can be repeated at each of the selected flight conditions. In this example, the initial unloaded shape is the same. However, the effects of the shape on the aerodynamics and the aerodynamics on the shape are considered in a coupled manner. Hence, the iterative nature of the process. In alternate embodiments, the effects of the shape change on the aerodynamics may not be considered.

In 366, a check can be performed to determine whether the shape of the flap at the simulated conditions makes contact with the seal, such as in the manner described with respect to FIGS. 5A and 5B. If the flap doesn't seal, in 372, a new flap shape can be determined. For example, if the flap doesn't seal because it bends in one direction due to the aeroelastic effects. The flap shape might be adjusted in the opposite direction in its unloaded state, to mitigate this effect. Similarly, if the flap twists in one direction due to the aeroelastic effects and the twisting prevents sealing, the initial flap shape can be twisted in the opposite direction to mitigate this effect.

In one embodiment, besides adjusting the shape of the flap, the locations of the attachment points on the flaps can be adjusted. For example, the attachment locations can be moved farther or closer together. In yet another embodiment, the internal structure of the flap or the materials used in the flap may be changed, such as to make it more or less stiff in certain locations. The change in the internal structure can affect how much and where the flap deforms. Hence, the sealing performance may be improved. In a further embodiment, the shape, location and/or size of the seal may be adjusted to improve the sealing characteristics of the flap.

In 368, a determination of whether the shape of the flap meets manufacturing constraints can be determined. For example, it can be specified that the slope of the flap at the wing/flap interface be somewhat continuous, i.e., the slope of the wing at the trailing of the wing and the slope of the flap adjacent to the trailing edge of the wing may have be within some percent of one another, such as 5%. In another example, it can be specified, that the difference in height between the trailing edge of the wing and the flap adjacent to the trailing edge of the wing be within some specified margin. In yet another example, it can be specified, the flap doesn't push the seal down greater than some amount. In a further example, it can be specified that the loads at the attachment points to the wing be less than some maximum value. In a yet further example, it can be specified that the distance between the leading edge of the flap and the trailing edge flap remains above some minimum distance and below some maximum distance.

In 372, if the manufacturing constraints are not met, then the shape of the flap can be adjusted. For example, the shape of the flap can be adjusted so it deforms to a shape that better matches the slope of the trailing edge of the wing. As another example, it can be adjusted to lessen the loads at attachment points to the wings.

In 370, if the flap seals and the manufacturing constraints are met, than the aerodynamic performance of the wing and flap combination can be determined at the various flight conditions. This analysis can involve performing simulations of the wing and flaps at various conditions, such as take-off or at landing. Further, the simulations can be performed with the flap at various positions, such as extended down for landing.

The aerodynamic constraints can be somewhat independent of the sealing constraints. For example, the shape of flap can be adjusted so that the aerodynamic performance is better at a flight condition where it is not important that the flap is totally sealed. Thus, as long as the adjusted shape seals at a desired condition, such as cruise conditions, it may be possible to make tweaks to the flap that improve aerodynamic performance. For example, the leading edge of the flap might be made more round to improve aerodynamic performance.

In 374, if the flap seals, the manufacturing constraints are met and the aerodynamic constraints are met, then the as-built geometry for the flap can be fixed. Composite flaps are built in a jig. Thus, the jig shape can be specified. The jig shape is the unloaded shape that can be installed on an aircraft. Next, a few details of an aircraft that can include the flap designed in FIG. 6 are described with respect to FIGS. 7 and 8.

Examples of Aircraft Application

An aircraft manufacturing and service method 400 shown in FIG. 7 and an aircraft 500 shown in FIG. 8 are now be described to better illustrate various features of processes and systems presented herein. The fuselage cradle support assembly can be used in any stage of the aircraft lifetime, such as prototyping, manufacture, operations and maintenance. As was described above, a cradle support assembly design can be used for supporting other types of objects and is not limited to supporting only an airframe. For example, the cradle support assembly can be used to support a tank or a rocket section during manufacture.

During pre-production, aircraft manufacturing and service method 400 may include specification and design 404 of aircraft 500 and material procurement 406. The production phase involves component and subassembly manufacturing 408 and system integration 410 of aircraft 500. System integration can also occur before material procurement 406. Aspects of the specification and design of a high-lift device surface, such as a trailing edge flap, for aircraft 500 is described above with respect to FIGS. 1-6. The methodology can be applied to other high-lift device surfaces and the example of the trailing edge flap is provided for the purposes of illustration only. Thereafter, aircraft 500 may go through certification and delivery 412 in order to be placed in service 414. While in service by a customer, aircraft 500 is scheduled for routine maintenance and service 416 (which may also include modification, reconfiguration, refurbishment, and so on). While the embodiments described herein relate generally to servicing of commercial aircraft, they may be practiced at other stages of the aircraft manufacturing and service method 400.

Each of the processes of aircraft manufacturing and service method 400 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 8, aircraft 500 produced by aircraft manufacturing and service method 400 in FIG. 7 may include airframe 518 with a plurality of high-level systems 520 and interior 522. Examples of high-level systems 520 include one or more of propulsion system 524, electrical system 526, hydraulic system 528, and environmental system 530. Any number of other systems may be included. For example, the flap designs described above can be used as part of an aerodynamic control system, which is shown in FIG. 1.

Apparatus and methods shown or described herein may be employed during any one or more of the stages of the aircraft manufacturing and service method 400. For example, components or subassemblies corresponding to component and subassembly manufacturing 408 may be fabricated or manufactured in a manner similar to components or subassemblies produced while aircraft 500 is in service. Also, one or more aspects of the apparatus, method, or combination thereof may be utilized during steps, 408 and 410, for example, by substantially expediting assembly of or reducing the cost of aircraft 500. Similarly, one or more aspects of the apparatus or method realizations, or a combination thereof, may be utilized, for example and without limitation, while aircraft 500 is in service, e.g., maintenance and service 416.

Conclusion

Different examples and aspects of the apparatus and methods are disclosed herein that include a variety of components, features, and functionality. In particular, apparatus and methods associated with a flap on a wing used on an aircraft are discussed. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

What is claimed is:

1. An aerodynamic system for an aircraft comprising:
   a fixed portion of a wing;
   a seal coupled to and extending from the fixed portion of the wing;
   a high-lift device surface coupled to the wing having an as-built shape determined based on an anticipated deformation during one or more flight conditions,
   wherein, while not in flight, the high-lift device surface in the as-built shape does not make contact with the seal or partially makes contact with the seal such that air can flow between the seal and the high-lift device surface, and wherein, at the one or more flight conditions, the high-lift device surface, under aerodynamic forces, deforms from the as-built shape to a second shape to fully contact the seal to prevent air flow between the seal and the high-lift device surface, wherein the full contact between the seal and the high lift device surface is caused by deformation due to the aerodynamic forces.

2. The aerodynamic system of claim 1, wherein the one or more flight conditions include a cruise condition.

3. The aerodynamic system of claim 1, wherein the as-built shape is bowed and straightens under the aerodynamic forces.

4. The aerodynamic system of claim 1, wherein the as-built shape is twisted and untwists under the aerodynamic forces.

5. The aerodynamic system of claim 1, wherein a loft of the as-built shape is increased such that the high-lift device surface flattens and lengthens under the aerodynamic forces.

6. The aerodynamic system of claim 1, wherein a leading edge of the high-lift device surface is shaped to improve an aerodynamic performance of the high-lift device surface while maintaining its ability to seal at the one or more flight conditions.

7. The aerodynamic system of claim 1, wherein high-lift device surface includes a middle portion between two ends and wherein the as-built shape is bowed downward in the middle portion and upwards near the two ends such that a portion of the high-lift device surface extends above a portion of the wing adjacent to the portion of the high-lift device surface.

8. The aerodynamic system of claim 1, wherein the high-lift device surface is a flap attached to a trailing edge of the fixed portion of the wing.

9. The aerodynamic system of claim 8, wherein the flap is configured to be positioned at a plurality of different positions during a cruise condition and wherein at each of the plurality of different positions the flap deforms under the aerodynamic force from the as-built shape such that the flap fully contacts the seal to prevent the air flow between the seal and the high-lift device surface.

10. The aerodynamic system of claim 8 wherein the flap is part of a trailing edge variable camber system.

11. The aerodynamic system of claim 1 wherein the high-lift device surface further includes one or more attachment interfaces which allow the high-lift device surface to move relative to the fixed portion of the wing.

12. The aerodynamic system of claim 1 wherein at an interface between the fixed portion of the wing and the high-lift device surface a slope of the fixed portion of the wing at the interface and a slope of the high-lift device surface at the interface substantially match.

13. The aerodynamic system of claim 1 wherein high-lift device surface is formed from a composite material, a metal or combinations thereof.

14. The aerodynamic system of claim 1 wherein the high-lift device surface is configured to retract and unretract and wherein, while not in flight, the high-lift device is retracted.

15. A method of generating a high-lift device surface comprising:
   determining a shape of a fixed portion of a wing and as-built shape of a high-lift device surface wherein the high-lift device surface is mechanically coupled to the wing such that it can move relative to the wing and wherein a seal is interposed between the fixed portion of the wing and the high-lift device surface that prevents air flow between the seal and the high-lift device surface at a flight condition;

determining a first structure and first materials of the wing and a second structure and second materials of the high-lift device surface; and specifying the flight condition; and wherein the as-built shape of the high-lift device surface is shaped based, at least in part, on an anticipated deformation during the flight condition such that it is configured to aeroelasticly deform from a first shape while not in flight to a second shape in flight wherein, in the first shape, gaps exist between the high-lift device surface and the seal and wherein in the second shape the gaps between the high-lift device surface and the seal are removed such that there is full contact between the seal and the high lift device surface that is caused by an aeroelastic deformation resulting from aerodynamic forces.

16. The method of claim 15, wherein the high-lift device surface is a flap.

17. The method of claim 16, wherein the flap is coupled to a trailing edge of the fixed portion of the wing.

18. The method of claim 17, wherein the flap is a component of a trailing edge variable camber system.

19. The method of claim 15, wherein flight condition is a cruise condition.

20. The method of claim 15, wherein the first shape is twisted relative to the second shape.

21. The method of claim 15, wherein the first shape is bowed relative the second shape.

22. An aircraft comprising:

a wing including a fixed portion of the wing;

a seal coupled to and extending from the fixed portion of the wing;

a high-lift device surface coupled to the wing having an as-built shape determined based on an anticipated deformation during one or more flight conditions, wherein, while not in flight, the high-lift device surface in the as-built shape partially makes contact with the seal such that air can flow between the seal and the high-lift device surface and wherein, at the one or more flight conditions, the high-lift device surface deforms under aerodynamic forces from the as-built shape to a second shape to fully contact the seal to prevent air flow between the seal and the high-lift device surface, wherein the full contact between the seal and the high lift device surface is caused by deformation due to the aerodynamic forces.

23. The aircraft of claim 22, wherein the high-lift device surface is selected from the group consisting of an aileron, a flaperon, a spoiler, a rudder, an elevator, a slat, a flap and a horizontal stabilizer.

* * * * *